(12) United States Patent
Eiriksson et al.

(10) Patent No.: US 7,660,264 B1
(45) Date of Patent: *Feb. 9, 2010

(54) METHOD FOR TRAFFIC SCHEDULIGN IN INTELLIGENT NETWORK INTERFACE CIRCUITRY

(75) Inventors: Asgeir Thor Eiriksson, Sunnyvale, CA (US); Wael Noureddine, Mountain View, CA (US); Chris Yuhong Mao, Fremont, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 426 days.

This patent is subject to a terminal disclaimer.

(21) Appl. No.: 11/313,003

(22) Filed: Dec. 19, 2005

(51) Int. Cl.
*H04L 12/28* (2006.01)
*H04L 12/56* (2006.01)

(52) U.S. Cl. ........................ 370/254; 370/412
(58) Field of Classification Search ................ 370/254, 370/391, 412, 469–473
See application file for complete search history.

(56) References Cited

U.S. PATENT DOCUMENTS

| | | | |
|---|---|---|---|
| 4,445,116 A | 4/1984 | Grow | |
| 4,533,996 A | 8/1985 | Hartung et al. | |
| 5,497,476 A | 3/1996 | Oldfield et al. | |
| 5,778,189 A | 7/1998 | Kimura et al. | |
| 6,087,581 A | 7/2000 | Emmer et al. | |
| 6,226,680 B1 | 5/2001 | Boucher et al. | 709/230 |
| 6,240,094 B1 | 5/2001 | Schneider | |
| 6,247,060 B1 | 6/2001 | Boucher et al. | 709/238 |
| 6,334,153 B2 | 12/2001 | Boucher et al. | 709/230 |
| 6,389,479 B1 | 5/2002 | Boucher et al. | 709/243 |
| 6,393,487 B2 | 5/2002 | Boucher et al. | 709/238 |
| 6,397,316 B2 | 5/2002 | Fesas, Jr. | |
| 6,401,117 B1 * | 6/2002 | Narad et al. | 709/223 |
| 6,427,171 B1 | 7/2002 | Craft et al. | 709/230 |
| 6,427,173 B1 | 7/2002 | Boucher et al. | 709/238 |
| 6,434,620 B1 | 8/2002 | Boucher et al. | 709/230 |
| 6,470,415 B1 | 10/2002 | Starr et al. | 711/104 |
| 6,510,164 B1 | 1/2003 | Ramaswamy et al. | |
| 6,591,302 B2 | 7/2003 | Boucher et al. | 709/230 |
| 6,594,268 B1 | 7/2003 | Aukia et al. | |
| 6,625,671 B1 | 9/2003 | Collette et al. | |

(Continued)

OTHER PUBLICATIONS

Office Action in U.S. Appl. No. 10/474,500, mailed Oct. 4, 2007.

(Continued)

*Primary Examiner*—Hong Cho
(74) *Attorney, Agent, or Firm*—Beyer Law Group LLP

(57) ABSTRACT

A method of operating intelligent network interface circuitry facilitates the tunneling of packets between at least one process, executing on a host computer, and a peer via a network, via the network interface circuitry. Packets are received from the process executing on the host computer. Modulation event tokens are managed, including receiving and providing modulation event tokens. Modulation events are processed. It is decided whether to transmit the received packets out to the network in association with modulation event processing, and the received packets are transmitted out to the network based on the deciding step. Based on a result of the modulation events processing step, modulation event tokens are caused to be fed back for receipt by the modulation event tokens managing step. As a result, the packets are tunneled through the network interface circuitry and the transmission of the packets is modulated out to the network.

25 Claims, 3 Drawing Sheets

U.S. PATENT DOCUMENTS

| | | | |
|---|---|---|---|
| 6,658,480 B2 | 12/2003 | Boucher et al. | 709/239 |
| 6,681,244 B1* | 1/2004 | Cross et al. | 709/203 |
| 6,687,758 B2 | 2/2004 | Craft et al. | 709/250 |
| 6,697,868 B2 | 2/2004 | Craft et al. | 709/230 |
| 6,708,223 B1 | 3/2004 | Wang et al. | |
| 6,708,232 B2 | 3/2004 | Obara | |
| 6,717,946 B1 | 4/2004 | Hariguchi et al. | |
| 6,751,665 B2 | 6/2004 | Philbrick et al. | 709/224 |
| 6,757,245 B1 | 6/2004 | Kuusinen et al. | |
| 6,757,746 B2 | 6/2004 | Boucher et al. | 709/250 |
| 6,798,743 B1 | 9/2004 | Ma et al. | |
| 6,807,581 B1 | 10/2004 | Starr et al. | 709/250 |
| 6,813,652 B2 | 11/2004 | Stadler et al. | |
| 6,862,648 B2 | 3/2005 | Yatziv | |
| 6,925,055 B1 | 8/2005 | Erimli et al. | |
| 6,941,386 B2 | 9/2005 | Craft et al. | 709/250 |
| 7,031,267 B2 | 4/2006 | Krumel | |
| 7,093,099 B2 | 8/2006 | Bodas et al. | |
| 7,114,096 B2 | 9/2006 | Freimuth et al. | |
| 7,133,902 B2 | 11/2006 | Saha et al. | |
| 7,133,914 B1 | 11/2006 | Holbrook | |
| 7,191,318 B2 | 3/2007 | Tripathy et al. | |
| 7,239,642 B1 | 7/2007 | Chinn et al. | |
| 7,254,637 B2 | 8/2007 | Pinkerton et al. | |
| 7,260,631 B1 | 8/2007 | Johnson et al. | |
| 7,284,047 B2 | 10/2007 | Barham et al. | |
| 7,313,623 B2 | 12/2007 | Elzur et al. | |
| 7,376,147 B2 | 5/2008 | Seto et al. | |
| 7,408,906 B2 | 8/2008 | Griswold et al. | |
| 7,453,892 B2 | 11/2008 | Buskirk et al. | |
| 2001/0010046 A1 | 7/2001 | Muyres et al. | |
| 2001/0021949 A1 | 9/2001 | Blightman et al. | 709/219 |
| 2001/0036196 A1 | 11/2001 | Blightman et al. | 370/465 |
| 2001/0037406 A1 | 11/2001 | Philbrick et al. | 709/250 |
| 2002/0039366 A1 | 4/2002 | Sano | |
| 2002/0087732 A1 | 7/2002 | Boucher et al. | 709/250 |
| 2002/0091844 A1 | 7/2002 | Craft et al. | 709/230 |
| 2002/0095519 A1 | 7/2002 | Philbrick et al. | 709/250 |
| 2002/0156927 A1 | 10/2002 | Boucher et al. | 709/250 |
| 2002/0161919 A1 | 10/2002 | Boucher et al. | 709/238 |
| 2003/0018516 A1 | 1/2003 | Ayala et al. | |
| 2003/0035436 A1 | 2/2003 | Denecheau et al. | |
| 2003/0140124 A1 | 7/2003 | Burns | 709/220 |
| 2003/0200284 A1 | 10/2003 | Philbrick et al. | 709/219 |
| 2003/0204631 A1 | 10/2003 | Pinkerton et al. | |
| 2004/0003094 A1 | 1/2004 | See | |
| 2004/0003126 A1 | 1/2004 | Boucher et al. | 709/250 |
| 2004/0028069 A1 | 2/2004 | Tindal et al. | |
| 2004/0030745 A1 | 2/2004 | Boucher et al. | 709/203 |
| 2004/0042487 A1 | 3/2004 | Ossman | |
| 2004/0054813 A1 | 3/2004 | Boucher et al. | 709/250 |
| 2004/0062245 A1 | 4/2004 | Sharp et al. | 370/392 |
| 2004/0062246 A1 | 4/2004 | Boucher et al. | 370/392 |
| 2004/0064578 A1 | 4/2004 | Boucher et al. | 709/236 |
| 2004/0064589 A1 | 4/2004 | Boucher et al. | 709/250 |
| 2004/0064590 A1 | 4/2004 | Starr et al. | 709/250 |
| 2004/0073703 A1 | 4/2004 | Boucher et al. | 709/245 |
| 2004/0078480 A1 | 4/2004 | Boucher et al. | 709/237 |
| 2004/0088262 A1 | 5/2004 | Boucher et al. | 705/65 |
| 2004/0100952 A1 | 5/2004 | Boucher et al. | 370/389 |
| 2004/0111535 A1 | 6/2004 | Boucher et al. | 709/250 |
| 2004/0117509 A1 | 6/2004 | Craft et al. | 709/250 |
| 2004/0158640 A1 | 8/2004 | Philbrick et al. | 709/230 |
| 2004/0158793 A1 | 8/2004 | Blightman et al. | 714/758 |
| 2004/0165592 A1 | 8/2004 | Chen et al. | |
| 2004/0190533 A1 | 9/2004 | Modi et al. | |
| 2004/0199808 A1 | 10/2004 | Freimuth et al. | |
| 2004/0213235 A1 | 10/2004 | Marshall et al. | |
| 2004/0240435 A1 | 12/2004 | Craft et al. | 709/250 |
| 2005/0071490 A1 | 3/2005 | Craft et al. | 709/230 |
| 2005/0120037 A1 | 6/2005 | Maruyama et al. | |
| 2005/0122986 A1 | 6/2005 | Starr et al. | 370/412 |
| 2005/0125195 A1 | 6/2005 | Brendel | |
| 2005/0135378 A1 | 6/2005 | Rabie et al. | |
| 2005/0135412 A1 | 6/2005 | Fan | |
| 2005/0147126 A1 | 7/2005 | Qiu et al. | |
| 2005/0190787 A1 | 9/2005 | Kuik et al. | |
| 2005/0216597 A1 | 9/2005 | Shah et al. | |
| 2005/0259644 A1 | 11/2005 | Huitema et al. | |
| 2005/0259678 A1 | 11/2005 | Gaur | |
| 2005/0289246 A1 | 12/2005 | Easton et al. | |
| 2006/0031524 A1 | 2/2006 | Freimuth | |
| 2006/0039413 A1 | 2/2006 | Nakajima et al. | |
| 2006/0075119 A1 | 4/2006 | Hussain | |
| 2006/0080733 A1 | 4/2006 | Khosmood et al. | |
| 2006/0133267 A1 | 6/2006 | Alex et al. | |
| 2006/0168649 A1 | 7/2006 | Venkat et al. | |
| 2006/0206300 A1 | 9/2006 | Garg et al. | |
| 2006/0209693 A1 | 9/2006 | Davari et al. | |
| 2006/0221946 A1 | 10/2006 | Shalev et al. | |
| 2006/0281451 A1 | 12/2006 | Zur | |
| 2007/0064737 A1 | 3/2007 | Williams | |
| 2007/0110436 A1 | 5/2007 | Bennett | |
| 2007/0201474 A1 | 8/2007 | Isobe | |
| 2008/0002731 A1* | 1/2008 | Tripathi et al. | 370/412 |
| 2008/0016511 A1 | 1/2008 | Hyder et al. | |
| 2008/0043750 A1 | 2/2008 | Keels et al. | |
| 2008/0232386 A1 | 9/2008 | Gorti et al. | |

OTHER PUBLICATIONS

Office Action in U.S. Appl. No. 11/137,146, mailed Mar. 5, 2008.
Office Action in U.S. Appl. No. 11/137,140, mailed Feb. 5, 2008.
Office Action in U.S. Appl. No. 11/250,894, mailed Jun. 26, 2008.
Notice of Allowance in U.S. Appl. No. 10/474,500, mailed Jul. 1, 2008.
Allowed Claims from U.S. Appl. No. 10/474,500.
Office Action in U.S. Appl. No. 11/330,898, mailed Oct. 8, 2008.
Office Action in U.S. Appl. No. 11/137,146, mailed Nov. 3, 2008.
Office Action in U.S. Appl. No. 11/356,850, mailed Dec. 3, 2008.
U.S. Appl. No. 60/690,465, filed Jun. 14, 2005.
U.S. Appl. No. 60/718,418, filed Sep. 19, 2005.
Office Action in U.S. Appl. No. 11/282,933 mailed Feb. 20, 2009.
Dalton et al., "*Afterburner: Architectural Support for High-Performance Protocols,*" http://www.hpl.hp.com/techreports/93/HPL-93-46.pdf, Jul. 1993, 18 Pages.
TRM Technologies, Inc., "*L4/L7 Switching,*" Downloaded from http://www.trm.ca/pages/t-tech7.html on Feb. 16, 2006, 3 Pages.
Madsen et al.," *Wireless Data Communication,*" Fall 2003 Presentation, Wireless Networks Division (WING), Allborg University.
Yocum et al., "*Anypoint: Extensible Transport Switching on the Edge,*" Proceedings of the 4th USENIX Symposium on Internet Technologies and Systems, Mar. 26-28, 2003, Seattle, WA, USA.
International Search Report in PCT/US02112679, dated Jul. 23, 2002.
Office Action in U.S. Appl. No. 11/250,894 mailed Jan. 26, 2009.
Office Action in U.S. Appl. No. 11/137,140 mailed Apr. 1, 2009.
Office Action in U.S. Appl. No. 11/130,898 mailed Apr. 2, 2009.
Office Action in U.S. Appl. No. 11/747,790 mailed May 12, 2009.
Office Action in U.S. Appl. No. 11/747,793 mailed Jun. 8, 2009.
Office Action in U.S. Appl. No. 11/217,661 mailed Jun. 9, 2009.
Pratt, Ian and Fraser, Keir, "Arsenic: A User-Accessible Gigabit Ethernet Interface," INFOCOM 2001. Twentieth Annual Joint Conference of the IEEE Computer and Communications Societies. Proceedings. IEEE, vol. 1, Issue, 2001 pp. 67-76 vol. 1.
Office Action in U.S. Appl. No. 11/137,146, mailed Jun. 23, 2009.
Office Action in U.S. Appl. No. 11/735,861, mailed Aug. 6, 2009.
Office Action in U.S. Appl. No. 11/137,140, mailed Aug. 21, 2009.
Office Action in U.S. Appl. No. 11/747,650, mailed Aug. 27, 2009.
Clark et al., "*An Analysis of TCP Processing Overhead,*" IEEE Communications Magazine, Jun. 1989, pp. 23-29.

Woodside et al., "*The Protocol Bypass Concept for High Speed OSI Data Transfer*," Research Paper. Available at: http://citeseer.ist.psu.edu/cache/papers/cs/26l04/http:zS zzSzw w w .sce.carleton.cazSzftpzSzpubzSzcmwzSzbpjan90.pdf/woodside90protocol.pdf.

Rütsche et al., "*TCP/IP on the Parallel Protocol Engine*," High Performace Networking, (IV, C-14), Elsevier Science Publishers, B.V. North Holland 1993.

Thia et al., "*High-Speed Osi Protocol Bypass Algorithm with Window Flow Control*," IFIP WG6.4 Third International Workshop on Protocols for High-Speed Networks, Stockholm, Sweden, May 13-15, 1992, pp. 53-68.

Thia et al., "*A Reduced Operation Protocol Engine (Rope) for a Multiple-Layer Bypass Architecture*," Protocols for High-Speed Networks IV, 4th IFIP International Workshop, Aug. 10-12, 1994, Vancouver, B.C., Canada, pp. 224-239.

Rütsche et al., "*Architectures of Multimedia Communication Subsystems*," IFIP Transactions; vol. C-23 archive, Proceedings of the IF1P TC6 International Conference on Information Networks and Data Communication table of contents, pp. 217-230, Year of Publication: 1994.

* cited by examiner

METHOD FOR TRAFFIC SCHEDULIGN IN INTELLIGENT NETWORK INTERFACE CIRCUITRY

PRIORITY CLAIM

This application is related to U.S. patent application Ser. No. 11/217,661, filed Aug. 31, 2005 and entitled "Protocol offload transmit traffic management," which is incorporated herein by reference in its entirety. This application is also related to U.S. patent application Ser. No. 11/282,933, filed Nov. 18, 2005 and entitled "A method for UDP Transmit Protocol Offload Processing with Traffic Management," which is incorporated herein by reference in its entirety.

TECHNICAL FIELD

The present invention relates to intelligent network interface circuitry and, in particular, to transmit traffic management intelligent network interface circuitry.

BACKGROUND

In general, applications executing on a host may communicate with one or more peers via a network using various communication protocols. For example, the International Standards Organization (ISO) has defined a framework for such protocols, known as the "7 layer model." Some host operating systems have the capability to manage the network traffic generated by the host. Traffic management includes, for example, quality of service based scheduling, rate control, flow control and congestion control.

Traffic management for high speed network adapters uses a lot of processing resources, which may consume a large fraction of the processing resources available in a system, or even exceed its capabilities. Another issue to be dealt with by an operating system of a host, when interfacing to a high speed network adapter, is the scheduling of packet transmissions to and from the adapter.

It is known to offload at least some specific protocol processing functions to intelligent network interface circuitry. For example, checksum offload is a common feature implemented in a modern network adapter. Example checksums supported in the context of the Internet include Internet Protocol (IP), Transmission Control Protocol (TCP) and User Datagram Protocol (UDP) checksums.

SUMMARY

A method of operating intelligent network interface circuitry facilitates the tunneling of packets between at least one process, executing on a host computer, and a peer via a network, via the network interface circuitry. Packets are received from the process executing on the host computer. Modulation event tokens are managed, including receiving and providing modulation event tokens. Modulation events are processed. It is decided whether to transmit the received packets out to the network in association with modulation event processing, and the received packets are transmitted out to the network based on the deciding step. Based on a result of the modulation events processing step, modulation event tokens are caused to be fed back for receipt by the modulation event tokens managing step. As a result, the packets are tunneled through the network interface circuitry and the transmission of the packets is modulated out to the network.

BRIEF DESCRIPTION OF FIGURES

FIG. 1 illustrates an architecture of a flow processor to handle modulation token processing. The figure shows checksum computation and insertion.

DETAILED DESCRIPTION

Figure 1:
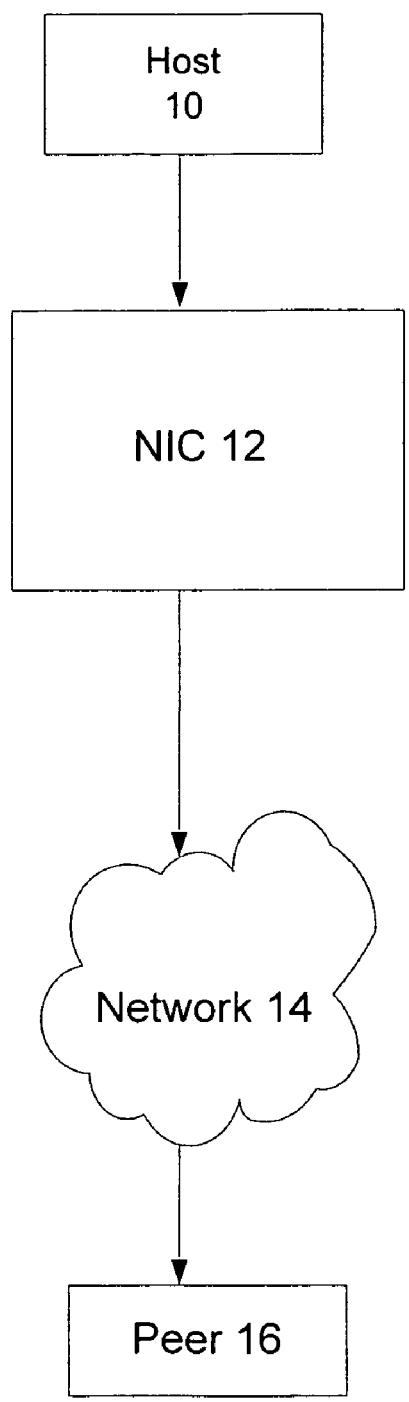
FIGS. 1-1 broadly illustrates a host communicating with a peer, via intelligent network interface circuitry and a network.
Figure 1:
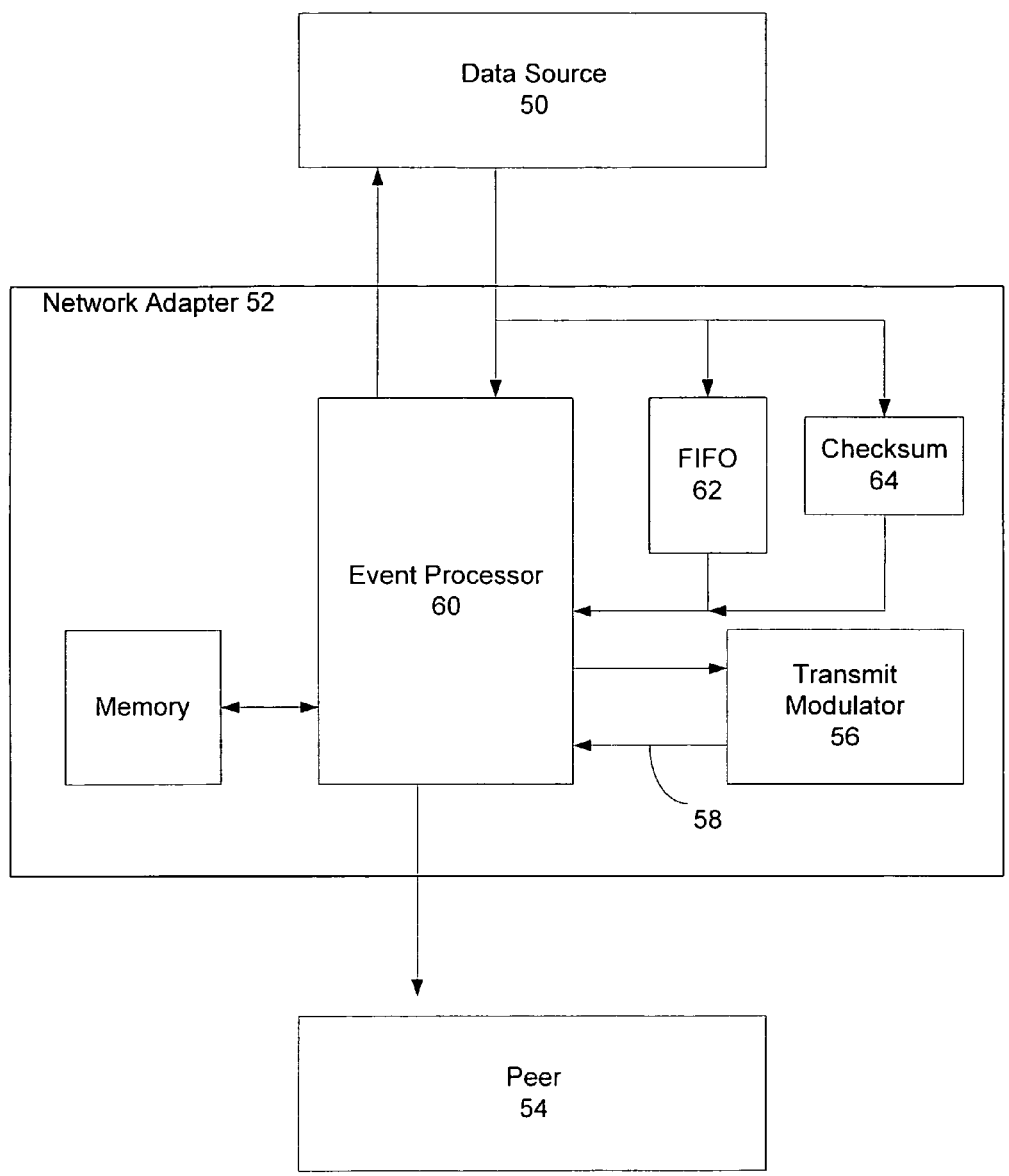

FIGS. 1-1 broadly illustrates a host communicating with a peer, via intelligent network interface circuitry and a network. A host 10 executes one or more operating systems and may execute one or more applications. The operating system and applications are a source of payload data to be transmitted to at least one peer 16 via a network 14. Payload data is encapsulated in protocol headers corresponding to the network protocol layers before transmission. Intelligent network interface circuitry 12 provides an interface between the host 10 and the network 14, for example, including handling communication protocol functions between the host 10 and the peer 16. In addition, the intelligent network interface circuitry is provided with transmit traffic management to control the transmission of encapsulated (packetized) payload data out to the network. Details of various example aspects of the transmit traffic management are discussed throughout this detailed description.

By providing the intelligent network interface circuitry with traffic management functions, it becomes possible to provide functionality that may not be possible to provide in a resource-constrained host. For example, such provided functionality may include rate traffic management functions in the form of rate control, flow control and congestion control. Additionally, flow control may be implemented between the operating system and the intelligent network interface circuitry, which addresses issues of scheduling packet transmissions to the intelligent network interface circuitry, and which integrates with the traffic management functions mentioned above.

One measure of network performance is end-to-end latency. In the context of network interface circuitry, minimizing the latency through the network interface circuitry is a laudable design goal. When designing traffic management functions in intelligent network interface circuitry, one should consider the impact of the design on the latency through the network interface circuitry. In accordance with one aspect, a methodology is described for checksum offload, for use with the traffic management functions, that is considered to minimally impact delays within the network interface circuitry.

Broadly speaking, traffic management may have many aspects. One aspect includes scheduling packet transmissions to the network such that different flows or groups of flows are allocated a desired transmission rate. For example, this may be a way to implement different levels of service, e.g., at a per-flow or per-destination basis. Another aspect may be providing control over allocation of resources (broadly, "network" resources, perhaps including either or both of the transmission path and the resources of peers) to different applications.

The set of packets included in a flow need not be predetermined but, rather, may be determined on a per-packet basis, in some cases by the host software. From the perspective of the network interface circuitry, a packet received from the host may be mapped by the network interface circuitry for transmission to a flow or stream traffic identifier (TID), or the packet may explicitly indicate that mapping. For example, the packets of a flow may belong to the same transport layer (e.g., TCP) connection or to several transport layer connections, or may not even be of the TCP type. In another example, the packets of a flow may be all packets destined to the same peer.

Another perhaps independent aspect of traffic management pertains to flow control, whereby the transmission of packets abides by a limit on a per-flow basis. An indication of the limit may be provided by the host to the intelligent network interface circuitry. It is noted that the host may adjust the limit and provide an indication of the adjusted limit at least in part based on feedback from the peers.

For example, the limit may be on the number of bytes to be sent, or on the number of packets to be sent, or on both. For example, the network interface circuitry may transmit a packet out to the network and subtract the size of the packet in bytes from the limit to determine a revised limit. If the revised limit is not large enough for a new packet to be sent, then the network interface circuitry suspends transmission until the limit is increased again. The limit (sometimes referred to as a "window") increase can correspond to receiving credits from the peer via an out-of-band mechanism.

The flow control scheme may operate at various granularities. For example, it may be implemented on a per 4-tuple (TCP/IP) basis. Other granularities are possible, such as a 2-tuple basis, including a source host IP address and destination host IP address in the context of the Internet. As indicated earlier, the mapping of packets to flows is arbitrary, and these examples are provided for the sake of illustration. In one example, the mapping of a flow to a TID may be obtained, for example, by locating a matching entry in a TCAM, using appropriate mask values to limit the information that is considered by the TCAM in locating the matching entry. An example of using a TCAM and mask values to obtain an TID is disclosed in U.S. patent application Ser. No. 11/250,894, filed on Oct. 13, 2005, and which is incorporated by reference herein in its entirety. See, for example, FIG. 3 of U.S. patent application Ser. No. 11/250,894 and the corresponding description relative to FIG. 3.

Another independent aspect of traffic management pertains to congestion control. Congestion control refers to subjecting the transmission of data (e.g., packets) to a limit based on the state of the network. Similar to the discussion above with respect to flow control, an indication of this limit may be provided by the host to the intelligent network interface circuitry. The host may adjust the limit and provide an indication of the adjusted limit based at least in part on explicit or implicit feedback from the network (including, as appropriate, peers).

Like flow control, the congestion control scheme may operate according to different granularities. It may be useful to implement it on a per 4-tuple basis (e.g., for TCP/IP) or on the basis of another flow granularity. That is, other granularities may be desirable as well, such as on a 2-tuple basis, including a source host IP address and destination host IP address in the context of the Internet. As indicated earlier, the mapping of packets to flows may be arbitrary, and these examples are provided for the sake of illustration.

We have discussed four aspects of traffic management—mapping packets to flows, rate control, flow control and congestion control.

In implementing traffic management in network interface circuitry, it may be necessary and/or useful to buffer data from the host to be transmitted by the network interface circuitry, in a buffer memory associated with the network interface circuitry. When traffic management subsequently causes the data to be transmitted out to the network, the data is read from the buffer memory and transmitted out onto the network (sometimes called, to the "wire").

Memory resources associated with intelligent network interface circuitry may be limited. In some examples, a mechanism is provided for the intelligent network interface circuitry to report to the host on the progress in transmitting packets of a flow to the network. Based on this reporting, the host may refrain from providing new data until at least part of the previously sent data are reported to be transmitted by the intelligent network interface circuitry. In this manner, a flow control scheme is effectively in place between the host and the network interface circuitry.

In some examples, the rate at which transmission progress reports are provided by the network interface circuitry to the host is moderated. For example, it may be desirable to provide a progress indication when a preset number of packets or a preset number of bytes have been transmitted, rather than every time a packet is transmitted.

We now discuss particulars of what may be considered a "packet." A packet is typically constructed as payload and a sequence of headers (at least one header), each header perhaps encapsulated in a lower layer header. The lowest layer is typically called the Medium Access Control (MAC) layer, though other identifiers are possible (e.g., under a generalized ISO 7-layer model). A MAC packet is usually called a frame, and includes a MAC header, payload bytes and a trailer. An example MAC layer is Ethernet. Encapsulated in a MAC frame is typically an upper layer protocol packet. In the context of the Internet, the most common protocol is the Internet Protocol (IP). Another common protocol encapsulated in the MAC frame is the Address Resolution Protocol (ARP). Encapsulated in an IP packet is typically a higher layer (transport layer) packet, such as a TCP or a UDP packet.

As mentioned above, in some examples, packets are formed in the host and "tunneled" through the intelligent network interface circuitry. In some examples, packets are formed in the intelligent network interface circuitry, encapsulating data (e.g., operating system or application payload or even other packets). In either case, packets that are not caused to be transmitted to the network (per the traffic management) are typically queued for transmission in a memory associated with the intelligent network interface circuitry. In order to recover the framing information, it may be necessary to read the framing information from the memory before transmitting each packet. As an example, the framing information associated with each packet may include a number of bytes that indicate the size of the packet. These bytes may be appended or pre-pended to the packet payload. Another possible implementation provides the framing information out of band, in a manner that allows the network interface circuitry to match the provided framing information with the associated packet. As an example, if the framing information and the packets are processed in two different First In First Out (FIFO) queues, the framing information at the head of the framing FIFO is easily associated with the corresponding packet at the head of the packet FIFO.

Transport layer (e.g., TCP or UDP) checksum offload is provided by most modern conventional network adapters. In the context of the Internet, transport layer checksums are typically computed over all the payload bytes of a packet and inserted in the header of the packet. As a result, a store and forward operation is utilized in order to compute the checksum and insert the computed checksum into the packet header.

When the state associated with traffic management is such that a packet is held in buffer memory of the network interface circuitry, it may be desirable to minimize the delay associated with saving the packet into the buffer memory. Similarly, when the state associated with traffic management is such that a packet is transmitted to the network as the packet is received from the host, it may be desirable to minimize the delay associated with sending the packet out on the network.

A method is described to compute the checksum and insert the checksum into the header of a packet, typically at the cost of one store-and-forward delay, regardless of whether the packet is to be provided to the network as the packet is received from the host, or the packet is to instead be saved in the memory associated with the intelligent network interface circuitry, e.g., based on the traffic management state.

In particular, from the perspective of checksum computation and insertion, a packet can be viewed as a sequence of bytes. In general, for the purpose of checksum computation and insertion, there are conceptually at least two byte offsets of interest within this byte sequence. The first is an indication of the byte offset for starting checksum computation. The second is an indication of the byte offset where the computed checksum is to be inserted.

From the perspective of Internet checksum computation specifically, the IP protocol specifies that the IP checksum is computed over the IP header part of a packet. The TCP (and UDP) protocols specify that the TCP (and UDP) checksum is computed over the TCP (and UDP) header and payload parts of the packet. In addition, the TCP (and UDP) checksum includes fields from the IP header part of the packet. The combination of the IP fields and the TCP (or UDP) header is known by some as a "pseudo-header."

We discuss several approaches to computing and inserting the checksums (e.g., IP and TCP or UDP). One approach includes parsing the appropriate data to be processed to decompose a sequence of bytes into a sequence of headers, and a payload, according to the encapsulated layers. The possibly multiple different checksums are then computed and inserted at the appropriate location in the corresponding header.

Another approach uses an indication of the two offsets for each of the protocols requiring a checksum. In one example implementation, the indication is provided by the host software. For the purpose of generating the pseudo-header for the transport checksums, it is possible to avoid parsing the IP header by supplying the partial checksum, pre-computed, for the IP fields for the pseudo-header. In one example, the partial checksum is provided by the host software.

As discussed above, it may be desirable that the processing in the intelligent network interface circuitry be capable of modulating the transmission of the packets across the network to have desired data rate characteristics. As an example, data transmission may be modulated based on a desired peak transmission rate to, for example, operate to defined quality of service transmission characteristics for particular customers, smooth out (i.e., not propagate) jitter from a data source, and/or attempt to match the receive capabilities of receiving peer devices.

FIG. 1 broadly illustrates modulating data transmission. A data source 50 is a source of data to be transmitted. For example, the data source 50 may be a host computer. A network interface controller 52 (or NIC) handles transmission of data, according to the traffic management to a peer 54 over a network. A data transmission modulator 56 controls the traffic management according to desired data transmission characteristics and based on feedback 58 (e.g., modulation event tokens) from the modulation event processing device 60 to the data transmission modulator 56. Packets received by the network interface circuitry 52 from the data source 50 are stored in a packet FIFO 62. A checksum module 64 examines the byte stream arriving to the FIFO 62, and computes the appropriate checksums using checksum offsets associated with the arriving packet. The checksum module 64 inserts the computed checksum at the appropriate offsets in the packet when the packet is streamed out of the FIFO 62.

Broadly speaking, the traffic management functionality controls the delivery of data across the network to nominally have desired data rate characteristics, and a transmission traffic management capability may be accomplished using various architectures. Typically, an indication of the desired characteristics for data delivery are provided from a host computer. In some cases, the desired characteristics associated with the traffic management are based at least partly on characteristics of the network.

We now describe a specific example of the intelligent network interface circuitry modulating the transmission of data across the network. In the specific example, a flow processor architecture for packet processing is employed, and a traffic management capability manages the operation of the flow processor (or, at least, portions of the flow processor) to control the flow of data communication via the network between the network intelligent network interface circuitry and peer devices. While the processor architecture in the described example is a flow processor architecture, other architectures (perhaps not even processors) may be employed.

Figure 2:
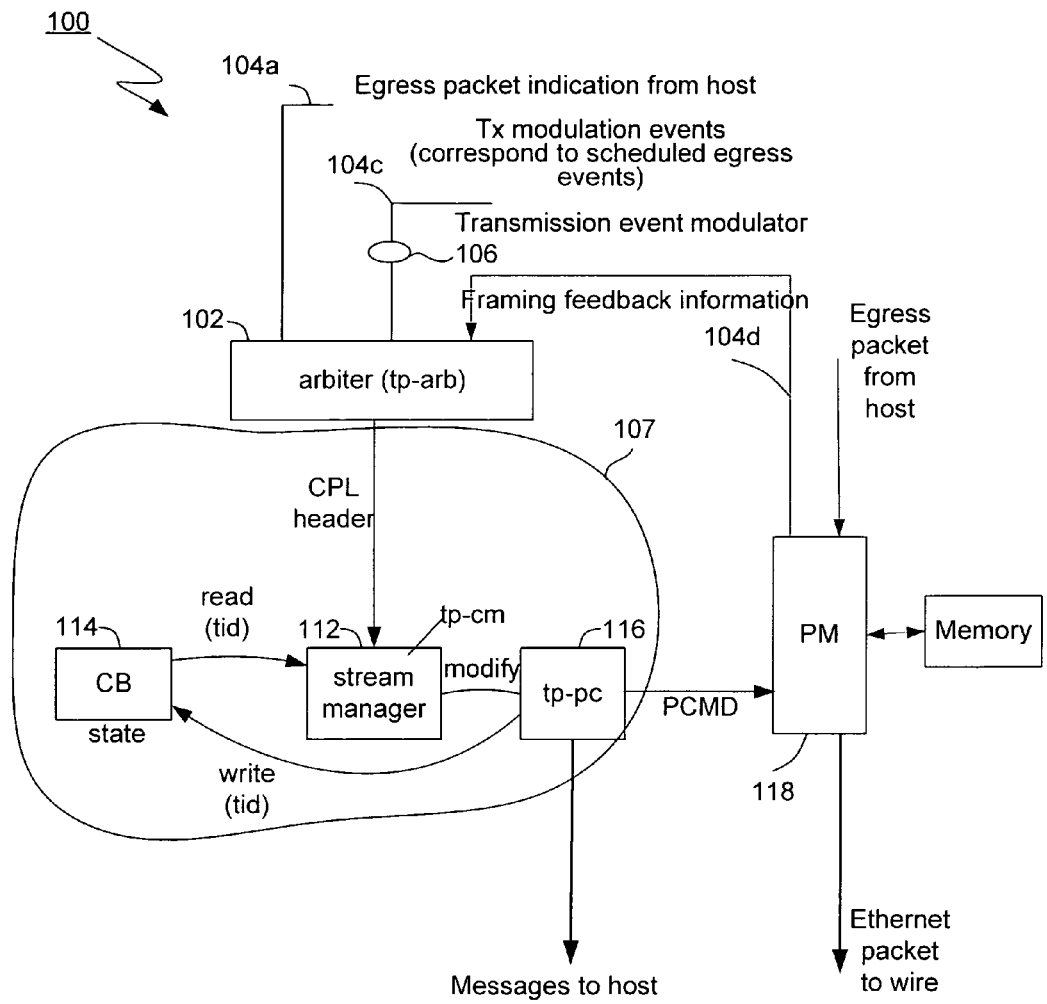
FIG. 2 illustrates a more detailed example of the traffic management portion of the FIG. 1 architecture.

Turning now to FIG. 2, the flow processor architecture of the intelligent network interface circuitry 100, having transmission traffic management capability, is described. An arbiter 102 arbitrates among various signals such as headers of control messages from a host (104a), transmission modulation event tokens (104c), and framing feedback messages (104d) from the payload manager block 118. Before proceeding to describe the remainder of the processor architecture, it is noted by way of introduction that the transmission modulation event tokens 104c, provided to the arbiter 102 via a transmission event modulator 106, are employed to modulate the transmission of data across the network from the intelligent network interface circuitry. It is noted that the arbiter 102 is a feature of the particular flow processor architecture of the FIG. 2 device and would typically have only an indirect effect on the transmission traffic management capability.

When the arbiter 102 operates to allow a transmission modulation event through (the source of the transmission modulation event tokens, including the transmission event modulator 106, is discussed in detail later), the transmission modulation event provides a stream traffic state identifier (TID) 107 to the Traffic Control Block TCB 114. The TCB loads the current state and attributes for the stream. Based on the current stream state and attributes provided from the TCB 114, the stream manager 112 decides how to appropriately modify the stream state and provides, to the payload command manager 116, an indication of the amount of data to be transmitted if applicable, as well as possibly an indication of modification to the stream state. Based on these indications, the payload command manager 116 issues one or more appropriate payload commands to the payload manager block 118. Furthermore, as appropriate based on the modified stream state and the availability of additional data to send for the stream, the stream manager 112 provides transmission modulation event tokens to the transmission event modulator 106.

The stream manager 112 writes the modified stream state and attributes back into the TCB 114. The read, modify and write of the stream state and attributes is done in an atomic operation.

Depending on the implementation, the stream manager 112 may recover the framing information associated with the next packet on the queue for transmission, a step preceding the transmission of the packet. In one example, the stream manager 112 provides an indication of the location in memory, where the framing information is located, to the payload command manager 116 or a similar module tasked with issuing memory commands. Based on this indication, the payload command manager 116 issues appropriate commands to the payload manager 118, or a similar module tasked with interfacing to memory. The payload manager then returns the framing information to the stream manager 112.

The payload manager block 118 provides the packet to the transmission block 120 (as discussed above, based on payload commands from the payload command manager 116).

As discussed above, the transmission modulation event tokens originate in the stream manager 112 and are provided to the transmission event modulator 106. In the example discussed above, a transmission modulation event is provided to the transmission event modulator 106 as the ultimate result of the arbiter 102 operating to allow a transmission modulation event through.

We now discuss the operation of a detailed example of the transmission event modulator 106, with specific reference to the FIG. 2 transmission event modulator 201 (an example of the transmission event modulator 106 in FIG. 1) and also with reference to FIG. 1.

We now discuss FIG. 2 in some detail. Referring to FIG. 2, a transmission event modulator 201 (as discussed above, a specific example of the FIG. 1 transmission event modulator 106) includes a data structure 202 provided to hold transmission modulation event tokens sent by the payload command manager 116 to the transmission event modulator 201.

In the FIG. 2 example, the FIFO's 204a through 204h (generally, 204) are usable for providing a shaping function. In general, then, modulation event tokens are stored into the appropriate portion of the data structure based on desired data transmission characteristics for the stream to which the modulation event token corresponds. For example, each FIFO 204 may correspond to a different Quality of Service promise.

We now discuss shaping. In one example, there are three types of shaping queues. One type of shaping queue is a FIFO, which provides control over the inter-packet delay for a group (class) of streams, while a second type is a FIFO which provides control over the inter-packet delay within a single stream. A third shaping queue is a heap structure, which graduates timers based on a deadline which is associated with each. When a timer is inserted into the heap, the deadline is determined based on the current time and the desired graduation delay.

The mapping of streams to shaping queues determines the shaping type (per-class or per-stream). The first type of shaping (per class) may be accomplished by having a single FIFO (modulation queue) being configured to graduate modulation event tokens based on the time elapsed since the last token was graduated. The second type of shaping (per stream) may be accomplished by having a single FIFO configured to graduate timers based on a deadline carried by each timer. Whenever a timer is inserted in the FIFO, its graduation time is set to a fixed delay from the current time. The overall effect is that data for each stream is transmitted at the same fixed rate, whereas the first type of shaping realizes a fixed rate on a per-class basis. The per-stream shaping can also be accomplished by using the heap structure.

A third example of shaping allows byte rate control on a per-class basis. Whenever a timer is inserted in the FIFO, the size of the associated packet is indicated along with it. When the timer graduates, a time proportional to the associated size needs to elapse before the following timer is graduated.

In some examples, triggering of a timer associated with a FIFO 214 means only that a modulation event in the FIFO 214 is ready to graduate out of the FIFO 214 and into the arbiter 102 (FIG. 1), not that the modulation event actually does so graduate. That is, as mentioned above, in some examples, an arbiter/selector 216 is provided at the output of the FIFO's 214 to arbitrate among those modulation event tokens that are ready to graduate. The arbiter 216 may be configured according to, for example, a priority scheme, round robin scheme, or other arbitration scheme.

For example, a weighted round robin scheme may be employed, where the weight for a modulation event varies according to how much data there is to send for the stream or group of streams corresponding to that modulation event.

What is claimed is:

1. A method of operating intelligent network interface circuitry to facilitate the tunneling of packets between at least one process, executing on a host computer, and a peer via a network, via the network interface circuitry, comprising:
   receiving packets from the process executing on the host computer;
   managing modulation event tokens, including receiving and providing modulation event tokens;
   processing modulation events;
   deciding whether to transmit the received packets out to the network in association with modulation event processing;
   transmitting the received packets out to the network based on the deciding step; and
   based on a result of the modulation events processing step, causing modulation event tokens to be fed back for receipt by the modulation event tokens managing step,
   whereby the packets are tunneled through the network interface circuitry and the transmission of the packets is modulated out to the network.

2. The method of claim 1, further comprising:
   computing and inserting at least one checksum into the packets that are transmitted in the packets transmitting step.

3. The method of claim 2, wherein:
   receiving a packet from the process executing on the host includes:
      storing the received packet into a first in, first out data structure; and
      receiving an indication of the starting byte offset for computing the checksum; and
      computing the checksum for the received packet; and
      receiving an indication of the byte offset for inserting the checksum; and
   the computed checksum is inserted into the packet at the indicated offset in the packet transmitting step, as the packet data is retrieved out of the first in, first out data structure.

4. The method of claim 2, wherein:
   a partial checksum is provided to the intelligent network interface circuitry from the host; and
   the partial checksum is used in the checksum computing step.

5. The method of claim 1, wherein:
at least part of the packet is held in a memory associated with the intelligent network interface circuitry prior to being transmitted over the network; and
as a result of the modulation event processing step, the packet framing is recovered in part through accessing the memory.

6. A method of operating intelligent network interface circuitry to facilitate the transfer of data between at least one process, executing on a host computer, and a peer via a network, comprising:
receiving data from the process executing on the host computer;
managing modulation event tokens, including receiving and providing modulation event tokens;
processing modulation events;
deciding whether to transmit packets including the received data out to the network in association with modulation event processing;
transmitting the packets based on the deciding step; and
based on a result of the modulation events processing step, causing modulation event tokens to be fed back for receipt by the modulation event tokens managing step.

7. The method of claim 6, wherein:
the modulation event tokens managing step includes categorizing the modulation event tokens into at least one category, such that each category of modulation event tokens corresponds to a separate desired data rate transmission characteristic.

8. The method of claim 7, wherein:
receiving data from the process executing on the host includes associating packets, including the received data, with one of the at least one modulation event token category.

9. The method of claim 7, wherein:
receiving data from the process executing on the host includes associating each packet, including the received data, with one of at least one packet stream; and
the method further comprises associating each packet stream with one of the at least one modulation event token category.

10. The method of claim 9, wherein:
the step of deciding whether to transmit packets is, for each of the at least one packet stream, based at least in part on at least one of a group consisting of an indication received from the peer and a state of the network.

11. The method of claim 9, wherein
the step of deciding whether to transmit packets is, for each of the at least one packet stream, based at least in part on a desired data rate transmission characteristic.

12. The method of claim 7, wherein:
the modulation event tokens in each category are provided with a timing that corresponds to the desired rate transmission characteristic indication for that category.

13. The method of claim 12, wherein:
notwithstanding the desired rate transmission characteristic indications, the step of providing the modulation event tokens is additionally subject to priority processing based on priorities associated with the categories.

14. The method of claim 13, wherein:
the priorities associated with the categories are based at least in part on an amount of data to be transmitted for the separate categories.

15. The method of claim 6, wherein:
receiving data from the process executing on the host includes associating packets, including the received data, with the desired data rate transmission characteristic; and
the method further comprises associating the packets with the desired transmission data rate characteristics includes providing at least a portion of the packets to a content-addressable memory.

16. The method of claim 15, wherein:
the content addressable memory includes, for at least some of the entries, mask information that is applied to the at least a portion of the packets before providing the at least a portion to the content-addressable memory.

17. The method of claim 6, wherein:
the desired transmission rate characteristics include at least one of a group consisting of a rate of packet transmission and a number of bytes to be transmitted per unit of time.

18. The method of claim 6, further comprising:
computing and inserting at least one checksum into a packet that is transmitted in the packets transmitting step.

19. The method of claim 18, wherein:
the checksum computing and inserting step includes processing offset indications provided to the intelligent network interface circuitry, wherein the offset indications indicate a start checksum offset into the packet and insert checksum offset into the packet, for each checksum.

20. The method of claim 18, wherein:
a partial checksum is provided to the intelligent network interface circuitry from the host; and
the partial checksum is used in the checksum computing step.

21. The method of claim 6, wherein:
a data structure is provided that holds the modulation event tokens;
the modulation event tokens managing step includes managing the storage of modulation event tokens into the data structure based on the fed back modulation event tokens and providing the modulation event tokens from the data structure based on the desired data rate transmission characteristics; and
the data structure includes a plurality of portions, each portion corresponding to a separate desired data rate transmission characteristic.

22. The method of claim 6, wherein:
the modulation event processing step includes determining a size of a packet to which the modulation event corresponds.

23. The method of claim 6, wherein:
the transmit packets deciding step is based at least in part on at least one of the group consisting of an indication received from the peer, and a state of the network.

24. The method of claim 6, further comprising:
providing, by the intelligent network interface circuitry, indications of progress of the packets transmitting step, and
using the indications of progress in the receiving data from the process step.

25. The method of claim 6, wherein:
at least part of the packet is held in a memory of the intelligent network interface circuitry prior to being transmitted over the network; and
as a result of the modulation event processing step, the packet framing is recovered in part through accessing the memory.

* * * * *

UNITED STATES PATENT AND TRADEMARK OFFICE
CERTIFICATE OF CORRECTION

| | | |
|---|---|---|
| PATENT NO. | : 7,660,264 B1 | Page 1 of 1 |
| APPLICATION NO. | : 11/313003 | |
| DATED | : February 9, 2010 | |
| INVENTOR(S) | : Eirisson et al. | |

It is certified that error appears in the above-identified patent and that said Letters Patent is hereby corrected as shown below:

On the title page item [54], delete "SCHEDULIGN" and insert --SCHEDULING--

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,660,264 B1 | Page 1 of 1 |
| APPLICATION NO. | : 11/313003 | |
| DATED | : February 9, 2010 | |
| INVENTOR(S) | : Eirisson et al. | |

It is certified that error appears in the above-identified patent and that said Letters Patent is hereby corrected as shown below:

On the title page item [54] and at Column 1, line 1, in the title, delete "SCHEDULIGN" and insert --SCHEDULING--

This certificate supersedes the Certificate of Correction issued March 30, 2010.

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,660,264 B1  Page 1 of 1
APPLICATION NO. : 11/313003
DATED : February 9, 2010
INVENTOR(S) : Eiriksson et al.

It is certified that error appears in the above-identified patent and that said Letters Patent is hereby corrected as shown below:

On the title page item [54] and at Column 1, line 1, in the title, delete "SCHEDULIGN" and insert --SCHEDULING--

This certificate supersedes the Certificates of Correction issued March 30, 2010 and April 27, 2010.

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,660,264 B1  Page 1 of 1
APPLICATION NO. : 11/313003
DATED : February 9, 2010
INVENTOR(S) : Eiriksson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 684 days.

Signed and Sealed this

Thirtieth Day of November, 2010

David J. Kappos
*Director of the United States Patent and Trademark Office*